UNITED STATES PATENT OFFICE.

THOMAS W. NICHOLS, OF NEW YORK, N. Y.

SOFT SOAP.

SPECIFICATION forming part of Letters Patent No. 249,478, dated November 15, 1881.

Application filed October 15, 1881. (No specimens.)

*To all whom it may concern:*

Be it known that I, THOMAS W. NICHOLS, a citizen of the United States, residing at New York city, in the county of New York and State of New York, have invented certain new and useful Improvements in Soft Soap; and I do hereby declare the following to be a full, clear, and exact description of the invention, such as will enable others skilled in the art to which it appertains to make and use the same.

My invention relates to improvements in soft soap; and it consists in compounding the following ingredients in the manner and proportions hereinafter given.

Permanganate of potassium, about two ounces; bark of alder, (*glutinosa*,) charred, about four pounds; ox-gall, about four ounces; arrow-root, (coontee or Florida,) about eight ounces; beeswax, about eight ounces; cantharides, about eight ounces; glycerine, about one pound; alcohol, about one pint; sal-soda, about three pounds; hard or bar soap, about four pounds; water, about thirty-two gallons.

Observing approximately the proportions given, I first saponify one-fourth to one-half of a pound of beeswax by boiling it in alcohol, to which, when liquefied, I add about one-half (½) pound liquefied cantharides, one pound of liquefied glycerine, and one pound of sal-soda, stirring the whole until thoroughly mixed and unified. This compound I set aside for future use, and designate it "A."

Second. When prepared to manufacture the soap I cut into small pieces four (4) pounds of bar-soap, which, together with two (2) pounds of sal-soda, I immerse in about twelve (12) gallons of boiling water, into which, when thoroughly dissolved, I stir about eight (8) ounces of arrow-root, four (4) four ounces of ox-gall, two (2) ounces of permanganate of potassium, stirring the whole until thoroughly mixed. This compound, which I use while hot, I designate as "B."

Third. I then take about four pounds of charred bark of the alder (*glutinosa*) and boil it for a quarter of an hour in from sixteen to eighteen gallons of water, which, while at a boiling-point, I strain off into a barrel or other suitable receptacle, into which I then pour alternately the compounds A and B, stirring the same the while to thoroughly mix them, thus producing in less than an hour about thirty-two (32) gallons of a beautiful highly-detergent soft soap, which can be used as well on the human skin, on paint, and woolen goods as for laundry and general domestic purposes, and which can be manufactured at an excessively trifling expense and without the necessity of employing any utensil not found in any household.

It is well known that ox-gall dissolves greasy matter, and for cleansing woolen stuffs is oftentimes preferred to soap. The phosphates and sulphates of soda, the chlorides of sodium and potassium, and the phosphates of calcium contained in the ox-gall readily combine with the alkalies in my soap. The acetic acid, with its kindred bases contained in the alder-bark, enters into and forms new combinations with the basic salts contained in the ox-galls, converting the coontee into an opaque paste, which readily unites with the alkalies and resinous substances contained in my soap. Through the action of the dilute acid bases on the coontee the volatile oil contained therein is set free and unites with the alcohol and the guayacales contained in the alder-bark, forming thereby a delightful pleasant perfume. The permanganate of potassium readily unites with the alkalies in the soap, where its antiseptic qualities prevent the formation of oleic acid, at the same time making the soap a powerful deodorizer, as well as a strong purifier, especially adapted to removing the stains and odors of perspiration, grease-spots from woolen goods, paint, &c., as well as a valuable soap for laundry and general domestic purposes.

Having now fully described my invention and the mode of manufacturing the same, what I esteem as novel, and desire to protect by Letters Patent, is—

1. Charred alder-bark, in combination with permanganate of potassium, ox-gall, arrow-root, beeswax, cantharides, glycerine, alcohol, sal-soda, bar-soap, and water, in the manufacture of soft soap, substantially in the proportions and the manner described.

2. Permanganate of potassium, in combination with charred alder-bark, ox-gall, arrow-root, beeswax, cantharides, glycerine, alcohol, sal-soda, bar-soap, and water, in the manufacture of soft soap, substantially in the proportion and manner described.

3. In the manufacture of soft soap, the combination of permanganate of potassium, charred alder-bark, ox-gall, arrow-root, beeswax, cantharides, glycerine, alcohol, sal-soda, bar-soap, and water, in the proportions and substantially in the manner described.

In testimony whereof I affix my signature in presence of two witnesses.

THOMAS W. NICHOLS.

Witnesses:
Jos. C. RYAN,
J. H. SOULÉ.